United States Patent Office 2,998,600
Patented Aug. 29, 1961

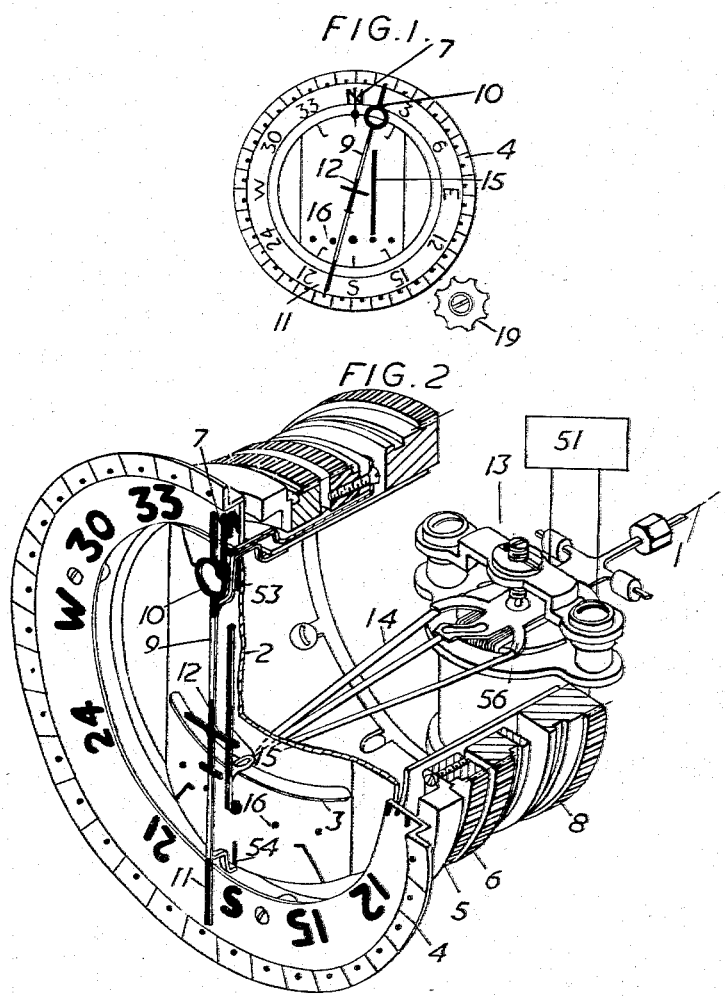

2,998,600
NAVIGATIONAL INSTRUMENTS
Alastair Michael Adair Majendie, Cookham Dean, Berkshire, England, assignor to Smiths America Corporation, Lakeland, Fla.
Filed July 13, 1955, Ser. No. 521,856
Claims priority, application Great Britain July 16, 1954
9 Claims. (Cl. 343—107)

The present invention relates to instruments to facilitate the steering of a moving craft in azimuth with reference to a track laid down by a radio beacon or the like.

According to the present invention, we provide a navigation instrument for use upon a moving craft comprising a first pointer rotatable in a plane about a first axis, a first scale centered and settable about said first axis, means to rotate said first pointer relative to said first scale in accordance with the heading of the craft, the angular displacement of the said pointer relative to a first datum upon said scale being equal to the compass heading of the craft, a second linear pointer adjacent and substantially parallel to said plane, said second pointer being displaceable in a direction substantially at right angles to itself and parallel to said plane and means to displace the second pointer from a second linear datum passing through the first axis in accordance with displacement of the craft relative to a track laid down by a radio beacon or the like whereby when the known heading of the track as indicated upon the first scale is aligned with the second datum, the position of the first axis and first pointer respectively relative to the second pointer indicate the position and heading of the craft relative to the track.

Conveniently a second scale is provided in a plane parallel to the first plane to indicate the magnitude of the displacement of the second pointer from the second datum.

An instrument constructed in accordance with the invention and adapted for use upon an aircraft will now be described with reference to the acompanying drawings, of which:—

FIGURE 1 shows a view of the dial and pointers of the instrument from the front, the instrument being in its normal viewing position.

FIGURE 2 shows an isometric view, partly in section, of the instrument, again in its normal viewing position.

Figure 3:
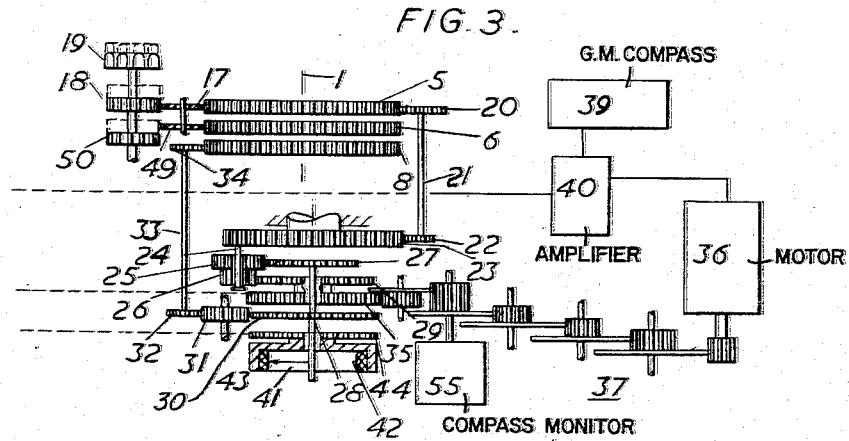
FIGURES 3 and 4 show certain gear trains and associated devices forming part of the instrument.

The instrument is mounted in a conventional cylindrical acse, the centre line of the case being indicated as an axis 1. A mask 2, painted black on its visible surface is mounted adjacent the usual viewing aperture of the case and is formed with a horizontal slot 3. It is surrounded by a conventional annular bearing scale 4 rotatable about axis 1, which is attached to a first ring gear 5, mounted in suitable bearings (not shown). A further ring gear 6 is also mounted in suitable bearings for rotation about axis 1 and has attached to it an index 7 moveable over sacle 4, the "heading index," in the form of a luminized bar and dot. Thus by rotation of gear 6 index 7 may be set about axis 1. A third ring gear 8 is also mounted in suitable bearings for rotation about axis 1 and is coupled to a heading pointer 9, also moveable over scale 4 and lying in a plane above that of index 7. Pointer 9 passes through axis 1 and lies parallel to a diameter of scale 4. It is formed, at one end with a luminized ring and bar 10, at the other end with a luminized bar 11 and centrally with a conventional luminized representation of a plan view of an aircraft, 12, the intersection of "wings" and "fuselage" lying on axis 1. A conventional milliammeter 13 is mounted behind mask 2 and has a rotor 56 disposed for rotation about an axis at right angles to axis 1, to which is attached a pointer 14 extending through slot 3. The pointer 14 carries, at the end lying in front of mask 3, a luminized vertical bar 15 which, in the zero position of the meter, passes through axis 1 and constitutes the second linear pointer or radio displacement bar. Bar 15 is thus parallel to but displaced from the axis about which the rotor 56 of meter 13 rotates, and variation in the current applied to meter 13 therefore produces rotation of bar 15 about an axis parallel to but displaced from itself. Displacement of bar 15 is indicated against a scale 16, comprising five luminized dots on mask 2, and a linear datum is defined by marks 53, 54 at opposite ends of a vertical diameter of the mask. It should be mentioned that the appropriate part of mask 2 is shaped to conform to the arc of movement of bar 15.

Figure 4:
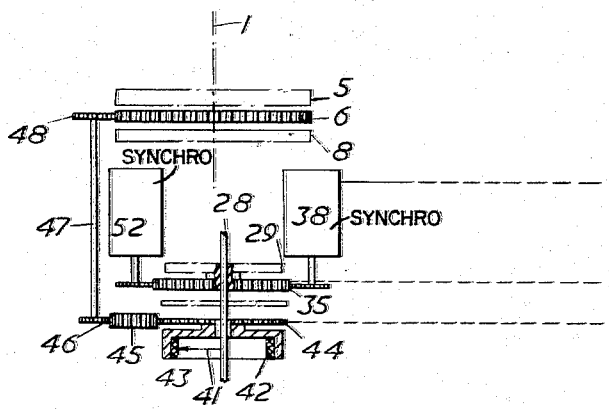

Referring now more particularly to FIGURES 3 and 4, gear 5 engages with a frictionally-braked idler 17 which may in turn be engaged by a gear 18 carried upon the same spindle as setting knob 19 on the front of the instrument. Gear 5 also engages with a pinion 20 carried upon a spindle 21. Spindle 21 carries a pinion 22 engaging with a gear 23, rotatable about an axis parallel to axis 1. Gear 23 carries, adjacent its periphery, a stub shaft 24 upon which are journalled two solidly-connected pinions 25 and 26 of different diameters. Pinion 25 engages with a wheel 27 mounted on a spindle 28 coaxial with gear 23. Pinion 26 engages with a wheel 29 mounted on a hollow shaft surrounding spindle 28. Gear 23, shaft 24, pinions 25 and 26, and gears 27 and 29 will be readily seen to constitute an epicyclic differential mechanism, inputs of which are fed in via 23 and 29 and the output being fed out via 27 and shaft 28. Shaft 28 carries a gear 30 which engages with an idler 31, in its turn engaging with a pinion 32 carried upon a spindle 33, carrying a pinion 34 engaging with ring gear 8. The sizes of 20, 22, 23, 25, 26, 27, 29, 30, 31, 32, 34 are so chosen that, if 29 is kept fixed and 5 is rotated, 8 is rotated through an equal angle in the same sense and, if 5 (and hence 23) is kept fixed and 29 is rotated, 8 is rotated through an equal angle in the opposite sense. It should be mentioned that the frictional restraint provided on ring gear 5 by braked idler 17 is sufficient to prevent its rotation when gear 29 is rotated. Gear 29 is solidly attached to gear 35 which is rotated by a chaser motor 36 through a reduction gear train indicated at 37. Gear 35 drives the rotor of a conventional transmitter synchro, indicated at 38. The output of transmitter synchro 38 together with signals derived from a gyromagnetic compass system indicated generally by block 39 is applied to an amplifier 40 whose output controls motor 36. Gear 35 is thus positioned in accordance with the magnetic heading of the aircraft in a known manner. The earlier-mentioned shaft 28 carries an insulated wiper 41 which engages with the winding 42 of a potentiometer 43. Winding 42 is insulated from but attached to a gear 44 mounted for rotation about the axis of shaft 28. Gear 44 engages with an idler 45, which in turn engages with a gear 46 attached to a spindle 47 carrying gear 48 engaging with ring gear 6. The sizes of 44, 46 and 48 are such that the velocity-ratio between gear 44 and ring gear 6 is unity. Ring gear 6 also engages with a frictionally-braked idler 49 rotatably mounted on the same shaft as idler 17 (previously mentioned). Idler 49 may be engaged by gear 50 carried upon the same spindle as previously mentioned gear 18 and knob 19. When knob 19 is pushed in gear 18 engages idler 17 so that by rotation of knob 19 the position of scale 4 may be adjusted and when it is pulled out gear 50 engages idler 49 (position shown in broken lines) and by rotation of knob 19 the position of heading index 7 may be adjusted.

The winding of milliammeter 13 is connected to the output of a conventional radio beacon receiver indicated by block 51. The output from the receiver is a D.C. signal depending in magnitude and sign upon the displacement of the aircraft from a selected track laid down by an appropriate ground station. Thus the displacement between the respresentation 12 and bar 15 indicates the displacement of the aircraft from the selected track. The radio beacon system comprising the ground station and receiver 51 may be of any convenient kind, for example those known under the designation "ILS" or "VOR."

It will be seen that the position of pointer 9 relative to scale 4 denotes the magnetic heading of the aircraft, rotation of scale 4 by knob 19 etc. not affecting the relative positions by reason of the earlier mentioned epicyclic differential mechanism. It will also be seen that the angular displacement between wiper 41 and winding 42 is equal to the angular displacement between pointer 9 and heading index 7.

In operation, if we suppose firstly that there is no wind, heading index 7 is set vertically above axis 1 conveniently by use of mark 53, receiver 51 is set to provide signals in accordance with displacement from the selected track and scale 4 is set, by rotation of knob 19, so that the known heading of the track is under index 7. Representation 12 and bar 15 will then indicate in a pictorial fashion the position and heading of the aircraft relative to the selected track. If in fact wind is present the instrument will be set up with the heading of the selected track (on scale 4) vertically above axis 1 and index 7 will be offset from a position vertically above axis 1 by the appropriate drift angle. When the aircraft is on the selected track bar 15 will lie below the intersection of the "wings" and "fuselage" of representation 12, and ring and bar 10 will lie over heading index 7.

When suitably energised potentiometer 43 will produce an output signal in accordance with the deviation of the actual heading of the aircraft from that required to follow the selected track. This signal is conveniently utilised in a device such as is described in United States application No. 521,857, now U.S. Patent No. 2,863,142, issued December 2, 1958, in the name of the present inventor and Frederick William Meredith to assist the pilot to steer the aircraft (under manual control) towards the track or may be used as an input signal to an automatic pilot for this purpose.

Block 52 (not previously referred to) indicates a synchro having a conventional three-phase wound stator and a rotor having two windings electrically at right angles. This may be utilised when the present instrument forms part of a gyromagnetic compass system to effect a comparison between the heading information provided by two similar instruments such as have been described.

Block 55 indicates a compass monitor such as is described in British Patent No. 669,471 and may be utilised to feed to an automatic pilot system a signal in accordance with deviation of the aircraft heading from that at which the automatic pilot is engaged.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. A navigation instrument for use upon a moving craft comprising a first pointer rotatable about a first axis at right angles thereto, rotation of the first pointer about the first axis thus defining a first plane, a first scale centered and settable about said first axis, means to rotate said first pointer relative to said first scale, a compass on the craft connected to control said means, the angular displacement of the said pointer relative to a first datum upon said first scale being indicative of the compass heading of the craft, a second linear pointer adjacent and substantially parallel to said plane and having a datum position in which the line of the pointer intersects said first axis, said second pointer being displaceable in a direction at right angles to itself to either side of said datum position when viewed normally to said plane, means to displace the second pointer from its datum position, and means responsive to displacement of the craft relative to a track laid down by a radio beacon or the like to control the means to displace the second pointer, whereby when the known heading of the track as indicated upon the first scale is aligned with the direction of the second pointer when in its datum position by appropriate setting of the first scale about the first axis, the position of the first axis and the first pointer respectively relative to the second pointer indicate the position and heading of the craft relative to the track.

2. An instrument as claimed in claim 1 comprising a second scale disploseed relative to the second pointer to indicate departure of the second pointer from its datum position.

3. An instrument as claimed in claim 1 comprising a differential mechanism having first and second input means and a single output means, the first and second input means being independently positionable to produce positioning of the output means in accordance with the difference of any changes in the positions of said input means, means linking the first input means and the first scale to position the first input means in accordance with rotation of the first scale about the first axis, means linking the second input means and said compass to position said second input means in accordance with the compass heading of the craft and means linking the output means and said means for rotating the first pointer to rotate said pointer relative to the first scale in accordance with the position of the output means.

4. An instrument as claimed in claim 3, in which said means linking said compass to the second input means comprises a chaser motor to position said second input means, a synchro positioned by the second input means and providing a signal in accordance with the position of said second input means, said compass providing a further signal in accordance with the magnetic heading of the craft, and means to control said chaser motor by said signal and said further signal to position said second input means in accordance with the magnetic heading of the craft.

5. An instrument as claimed in claim 4 comprising also an index settable about the first axis and arranged to co-operate with the first scale and first pointer.

6. An instrument as claimed in claim 5 comprising a two-part signal pick-off device, a first part of said device being positioned by the output means of the differential mechanism and the second part being positioned in accordance with the angular setting of the index about the first axis, the said pick-off being adapted to give a signal in accordance with angular displacement between the first pointer and the index.

7. An instrument as claimed in claim 1 wherein the second linear pointer is mounted for rotation about a second axis parallel to but displaced from said second pointer and at right angles to the first axis.

8. An instrument as claimed in claim 7 wherein the means responsive to displacement of the craft relative to the track produce an electric signal in accordance with displacement of the aircraft from a selected radio track, and comprising a device energized by said electric signal having a rotor rotated about said second axis in accordance with said electric signal and coupled to said second pointer.

9. The combination set forth in claim 1, said first pointer being so constructed and arranged that it extends on either side of said first axis whereby the point on said first pointer where it crosses said first axis represents the position of the moving craft.

(References on following page)

References Cited in the file of this patent

UNITED STATES PATENTS

| | | |
|---|---|---|
| 2,502,721 | Halpert | Apr. 4, 1950 |
| 2,613,352 | Kellog | Oct. 7, 1952 |
| 2,732,550 | Reedy | Jan. 24, 1956 |
| 2,823,378 | Reedy | Feb. 11, 1958 |
| 2,847,668 | Calvert | Aug. 12, 1958 |

FOREIGN PATENTS

| | | |
|---|---|---|
| 496,521 | Great Britain | Dec. 1, 1938 |
| 562,049 | Great Britain | June 15, 1944 |